(12) United States Patent
Umemoto et al.

(10) Patent No.: US 6,366,409 B1
(45) Date of Patent: Apr. 2, 2002

(54) LIGHT PIPE UNIT, PLANE LIGHT SOURCE UNIT AND LIQUID-CRYSTAL DISPLAY DEVICE

(75) Inventors: Seiji Umemoto; Toshihiro Ariyoshi; Takao Suzuki; Hideo Abe, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/703,652

(22) Filed: Nov. 2, 2000

(30) Foreign Application Priority Data

Nov. 2, 1999 (JP) .......................................... 11-311917
Dec. 13, 1999 (JP) .......................................... 11-353140

(51) Int. Cl.$^7$ .......................... G02B 27/10; G02B 6/00; G02F 1/1335
(52) U.S. Cl. ...................... 359/628; 385/901; 362/561
(58) Field of Search ................................ 359/628, 623, 359/636, 619; 385/901, 37, 36, 146, 10; 362/31, 551, 561; 349/63, 65, 64

(56) References Cited

U.S. PATENT DOCUMENTS

| | | | |
|---|---|---|---|
| 5,727,107 A | 3/1998 | Umemoto et al. | 385/116 |
| 5,835,661 A * | 11/1998 | Tai et al. | 385/146 |
| 6,167,182 A * | 12/2000 | Shinohara et al. | 385/129 |
| 6,295,405 B1 * | 9/2001 | Jannson et al. | 385/146 |
| 6,309,080 B1 * | 10/2001 | Sasako et al. | 362/31 |
| 6,313,891 B1 * | 11/2001 | Nagakubo et al. | 349/65 |

* cited by examiner

*Primary Examiner*—Georgia Epps
*Assistant Examiner*—Saeed Seyrafi
(74) *Attorney, Agent, or Firm*—Sughrue Mion, PLLC

(57) ABSTRACT

In a light pipe unit, a surface light pipe includes at least upper and lower surfaces and connected side surfaces constituted by an incident side surface formed between the upper and lower surfaces and side surfaces adjacent to the incident side surface. A linear light pipe includes a light supply surface, and the surface light pipe is connected to the linear light pipe through the connected side surfaces and the light supply surface so that the linear light pipe converts incident light from a point light source into a linear light source and outputs the light of the linear light source through the light supply surface. The surface light pipe converts incident light from the linear light source into a plane light source. In another light pipe unit, a linear light pipe for converting incident light from a point light source into a linear light source, and a surface light pipe for converting incident light from the linear light source into a plane light source are provided. The linear light pipe and the surface light pipe are partially connected to each other. Further, a plane light source unit wherein a point light source is disposed on the linear light pipe of one of the above light pipe units and a liquid-crystal display device provided with the above-mentioned plane light source unit and a liquid crystal cell are provided.

27 Claims, 4 Drawing Sheets

LIGHT PIPE UNIT, PLANE LIGHT SOURCE UNIT AND LIQUID-CRYSTAL DISPLAY DEVICE

BACKGROUND OF THE INVENTION

1. Field of the Invention

The present invention relates to a light pipe unit for converting light of a point light source efficiently into a plane light source to thereby make it possible to form a plane light source unit excellent in brightness and in its uniformity and to form a transmission type or reflection type liquid-crystal display device which is bright and easy to view.

The present application is based on Japanese Patent Applications Nos. Hei. 11-311917 and 353140, which are incorporated herein by reference.

2. Description of the Related Art

A side-lighting type plane light source unit having a light source disposed on a side surface of a light pipe having prism-like irregularities was heretofore known as a plane light source unit capable of forming a transmission type or reflection type liquid-crystal display device by use of a back-lighting or front-lighting system. Generally, a cold-cathode tube was used as the light source in such a plane light source unit. There was, however, a disadvantage that the cold-cathode tube was so large in consumed electric power that the frequency of required battery-exchanges was high when the plane light source unit was used portably.

In consideration of the above description, there was a proposal to arrange point light sources such as light-emitting diodes on an incidence side surface of a light pipe. Incidentally, the light-emitting diodes had advantages in reduction of consumed electric power, reduction of space and weight owing to use of no inverter, measures against electromagnetic wave, etc. From the point of view of prevention of disorder of a display image, improvement of light utilizing efficiency, etc., it was, however, difficult to incorporate a light scattering mechanism in the aforementioned light pipe. Hence, light was emitted like a stripe bright-line pattern corresponding to the location of arrangement of the point light sources. There was a problem that a large difference occurred between brightness and darkness to cause shortage of uniformity of brightness.

There was also a proposal to arrange a light-emitting diode on a side surface of a rod-like light pipe to thereby form a linear light source. The light-emitting diode was however needed to be positioned highly accurately on the incidence side surface of the light pipe in order to improve efficiency of incidence of light compared with the cold-cathode tube. Hence, a mechanism for holding the light-emitting diode was required, so that the number of parts was increased. There was a disadvantage that production efficiency ran short. Particularly in the case of a thin type light pipe, it was difficult to arrange the rod-like light pipe serving as a linear light source on the incidence side surface positionally accurately. Hence, when a light-emitting surface of the linear light source was connected to the incidence side surface of the light pipe so as to be integrated with the light pipe, uniformity of incidence of light was apt to be spoiled in a portion of connection between the light-emitting surface of the linear light source and the incidence side surface of the light pipe. Shade or emission line was apt to be produced. This was apt to cause lowering of display quality. If the contact area was reduced in order to prevent the lowering of display quality, the light pipe was apt to be ruptured because of shortage of strength. Particularly the connection portion was apt to become fragile. There was a disadvantage that the light pipe was hard to handle and was poor for practical use and that it was difficult to mass-produce the light pipe by injection molding, or the like.

SUMMARY OF THE INVENTION

An object of the present invention is to develop a light pipe unit capable of converting a point light source into a plane light source to thereby make it possible to form a plane light source unit excellent in brightness and in its uniformity and to form a transmission type or reflection type liquid-crystal display device which is bright and easy to view.

According to the first aspect of the present invention, there is provided a light pipe unit comprising: a surface light pipe including upper and lower surfaces and connected side surfaces constituted by an incident side surface formed between the upper and lower surfaces and side surfaces adjacent to the incident side surface; a linear light pipe including a light supply surface; the surface light pipe being connected to the linear light pipe through connected side surfaces and the light supply surface so that the linear light pipe converts incident light from a point light source into a linear light source and outputs the light of the linear light source through the light supply surface, and the surface light pipe converts incident light from the linear light source into a plane light source. There are further provided a plane light source unit wherein a point light source is disposed on a linear light pipe in the aforementioned light pipe unit, and a liquid-crystal display device comprising the plane light source unit and a liquid crystal cell.

According to the present invention, the surface light pipe and the linear light pipe are connected to each other through the connected side faces adjacent to the incidence side surface of the surface light pipe and the light supply surface of the linear light pipe. Variation in intensity of light incident on the surface light pipe through the connection portion can be suppressed to there by prevent production of shade or emission line. At the same time, the linear light pipe can be positioned highly accurately with respect to the incidence side surface of the surface light pipe so as to be arranged easily in a state excellent in efficiency of light incidence. Moreover, the resulting light pipe can be obtained as a light pipe unit easy to handle and of good practical use because the surface light pipe and the linear light pipe can be integrated with each other with a sufficient strength. Moreover, the resulting light pipe can be obtained as a light pipe unit that can be mass-produced by injection molding, or the like, because any mechanism-for holding the linear light pipe is not required so that the number of parts can be reduced.

As a result, light of a point light source is converted into a linear light source through the linear light pipe. The linear light source is further converted into a plane light source through the surface light pipe efficiently. Hence, a compact plane light source unit excellent in brightness and its uniformity and low in consumed electric power can be obtained. When the plane light source unit is used in a back-lighting or front-lighting system, a transmission type or reflection type liquid crystal display device which is bright, easy to view, excellent in display quality, low in consumed electric power and compact can be obtained with good production efficiency.

According to the second aspect of the present invention, there are provided: a light pipe unit comprising a linear light pipe for converting incident light from a point light source into a linear light source, and a surface light pipe for converting incident light from the linear light source into a plane light source, the linear light pipe and the surface light pipe being partially connected to each other; a plane light source unit wherein a point light source is disposed on the linear light pipe of the light pipe unit; and a liquid-crystal display device provided with at least the above-mentioned plane light source unit and a liquid crystal cell.

In the light pipe unit according to the present invention, light of a point light source is converted into a linear light source through the linear light pipe. The linear light source is further converted efficiently into a plane light source through the surface light pipe which is excellent in brightness and in its uniformity. When the plane light source unit is used in a back-lighting or front-lighting system, a transmission type or reflection type liquid crystal display device which is bright, and easy to view can be obtained.

Because the linear light pipe and the surface light pipe are partially connected to each other so as to be integrated with each other, the linear light source can be positioned highly accurately with respect to the incidence side surface of the surface light pipe. Hence, the linear light source can be disposed easily in a state excellent in efficiency of incidence of light. Moreover, it can be made unnecessary to provide separately any mechanism for holding the linear light pipe. Hence, the number of parts can be reduced. Hence, a plane light source unit or a liquid-crystal display device small in consumed electric power and compact in size can be obtained with good productivity.

Features and advantages of the invention will be evident from the following detailed description of the preferred embodiments described in conjunction with the attached drawings.

DETAILED DESCRIPTION OF THE PREFERRED EMBODIMENTS

Figure 1:
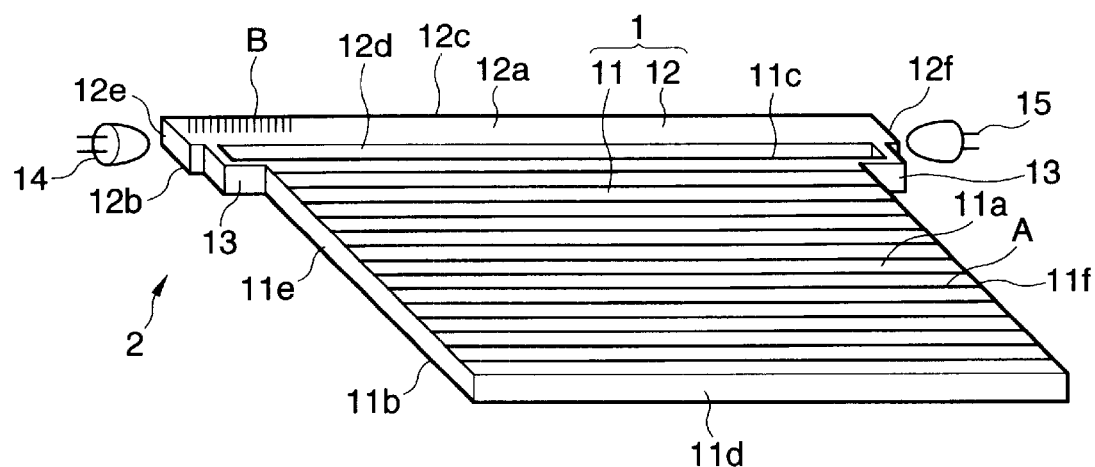
FIG. 1 is a perspective view of a plane light source unit (light pipe unit)
Figure 2:
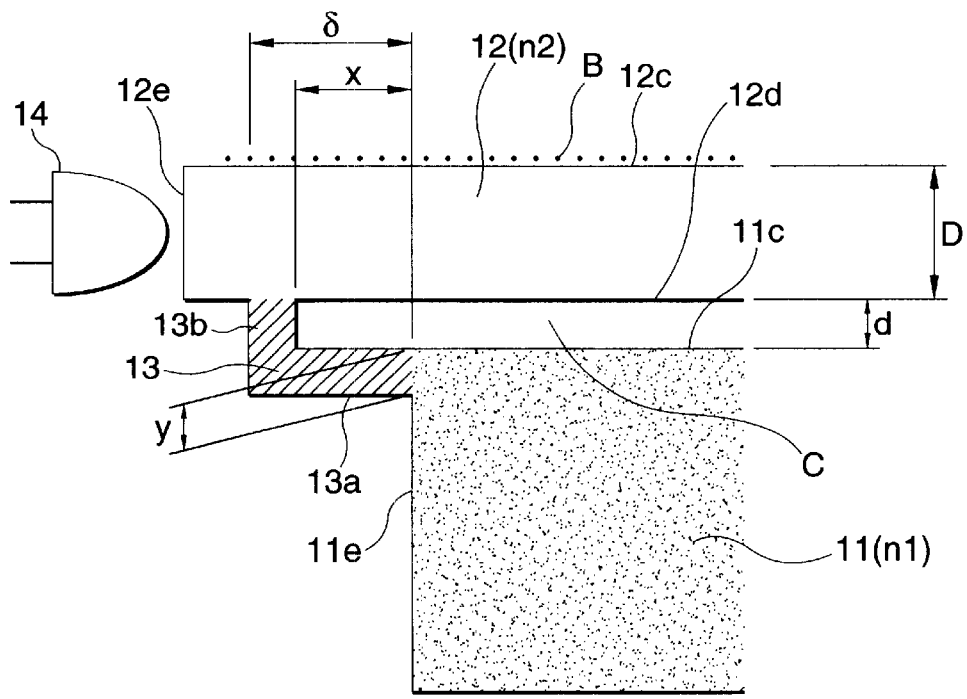
FIG. 2 is a plan view of a connection portion.

According to the present invention, there is provided a light pipe unit comprising: a surface light pipe including upper and lower surfaces and connected side surfaces constituted by an incident side surface formed between the upper and lower surfaces and side surfaces adjacent to the incident side surface; a linear light pipe including a light supply surface; the surface light pipe being connected to the linear light pipe through connected side surfaces and the light supply surface so that the linear light pipe converts incident light from a point light source into a linear light source and outputs the light of the linear light source through the light supply surface, and the surface light pipe converts incident light from the linear light source into a plane light source. FIGS. 1 and 2 show an example of such a light pipe unit. The reference numeral 1 designates a light pipe unit; 11, a surface light pipe; 12, a linear light pipe; and 13, connection portions. Incidentally, FIG. 1 shows the case where the light pipe unit 1 is applied to a plane light source unit 2. The reference numerals 14 and 15 designate point light sources.

A suitable plate capable of converting incident light from a linear light source into a plane light source can be used as the surface light pipe. As shown in FIG. 1, the surface light pipe is generally constituted by a plate-like member having at least an upper surface 11a, a lower surface 11b opposite to the upper surface 11a, an incidence side surface 11c acting as a side surface between the upper and lower surfaces 11a and 11b, and side faces lie and 11f adjacent to the incidence side surface 11c. A light output means A is provided in one of the upper and lower surfaces of the surface light pipe so that light transmitted from the incidence side surface to the one of the upper and lower surfaces is made to go out from the other of the upper and lower surfaces by the light output means A. Incidentally, FIG. 1 shows the case where the light output means A is provided in the upper surface 11a so that light exits from the lower surface 11b. That is, FIG. 1 shows the case where the lower surface serves a light exit surface.

The surface light pipe to be used preferably from the point of view of light utilizing efficiency, etc. is configured so that a light output means constituted by a repetitive structure of irregularities, particularly prism-like irregularities having slopes capable of reflecting, particularly entirely reflecting light incident on the incidence side surface to control an optical path is provided in either one of the upper and lower surfaces of the surface light pipe. Hence, light can be made to exit from the light exit surface through the light output means with good directivity.

The repetitive structure of slopes for forming the aforementioned light output means may be also constituted by convex or concave portions each having equal side faces. From the point of view of improvement of light utilizing efficiency, etc., it is preferable to provide a repetitive structure constituted by convex or concave portions each having at least a combination of a slope or short side surface and a flat or long side surface. Incidentally, discrimination between convex portions and concave portions is made by whether the surface in which the light output means is formed is protruded (convex) or depressed (concave) with respect to a reference plane.

From the above description, the preferable light output means is configured so that light as large in quantity as possible exits from the light exit surface of the surface light pipe in a direction perpendicular (normal) to the reference plane and so that the direction of light leaking from the surface light pipe is prevented as sufficiently as possible from overlapping the direction of the exit light serving as display light when the plane light source unit is used as a front-lighting system for a reflection type liquid-crystal display device. If leaking light overlaps display light, the intensity of a display image is reduced so that the reduction of intensity is apt to cause lowering of contrast.

From the point of view of the exit of light in a direction of a normal line and prevention of overlapping between leaking light and display light, it is preferable that the irregularities are provided as a repetitive structure of irregularities each having a slope or short side surface inclined at an inclination angle in a range of from 35 to 45 degrees with respect to the reference plane on a side opposite to one of the upper and lower surfaces of the surface light pipe having the light output means, that is, on a side of the light exit surface, and a flat or long side surface inclined at an inclination angle of not larger than 10 degrees, particularly in a range of from 0 (not inclusively) to 10 degrees.

The aforementioned slopes or short side faces have a role of reflecting light given to the slopes or short side faces among the light incident on the incidence side surface to thereby supply the reflected light to the light exit surface. Therefore, the short side faces, or the like, are formed as slopes facing the incidence side surface with a large inclination angle. In this case, setting the inclination angle of the short side faces, or the like, to be in a range of from 35 to 45 degrees permits transmission light to be reflected well perpendicularly to the light exit surface. Thus, output light favorable for display can be obtained efficiently.

From the point of view of the aforementioned performances such as total reflection based on Snell laws, suppression of leaking light, suppression of disturbance of viewing owing to the leaking light, etc., the preferable inclination angle of the short side faces, or the like, is in a range of from 38 to 43 degrees, particularly in a range of from 40 to 42 degrees. If the inclination angle of the short side faces, or the like, is smaller than 35 degrees, the direction of light exiting from the light exit surface has a large angle to the normal line. As a result, the quantity of light allowed to be effectively used for viewing is reduced so that brightness is apt to be lowered. If the inclination angle is larger than 45 degrees, the quantity of light leaking from the surface in which the light output means is formed is apt to be increased.

On the other hand, the flat or long side faces have a role of reflecting transmission light incident on the flat or long side faces to thereby supply the reflected light to the short side faces, or the like. When the plane light source unit is used as a back-lighting system for a transmission type liquid-crystal display device, the flat or long side faces have a role of improving light utilizing efficiency through a reflection layer, or the like. When the plane light source unit is used as a front-lighting system for a reflection type liquid-crystal display device, the flat or long side faces have a role of transmitting a display image from a liquid-crystal cell. It is preferable from this point of view that the inclination angle of the long side faces, or the like, with respect to the reference plane of the light exit surface is in the aforementioned range.

From the above description, when transmission light at an angle larger than the inclination angle is incident on the long side faces, or the like, the light is reflected by the longside faces, or the like. In this case, the light reflected at an angle more parallel to the light exit surface on the basis of the inclination angle of the long side faces, or the like, is incident on the short side faces, or the like. Hence, the light is reflected by the short side faces, or the like, so that the reflected light is condensed well by the aforementioned collimation and exits from the light exit surface. As a result, transmission light entering the short side faces, or the like, on the basis of reflection by the long side faces, or the like, after entering the long side faces, or the like, in addition to transmission light directly entering the short side faces, or the like, can be supplied to the light exit surface on the basis of reflection by the short side faces, or the like. Hence, improvement of light utilizing efficiency can be attained correspondingly. Moreover, the angle of incidence of light entering the short side faces, or the like, after the light is reflected by the long side faces, or the like, can be kept constant. Hence, variation in reflection angle can be suppressed so that collimation/condensation of the exit light can be attained.

Hence, adjusting the inclination angles of the slops or short side faces and the flat or long side faces in the irregularities for forming the light output means permits high-grade directivity to be given to output light. Hence, light can be made to go out perpendicularly to the light exit surface or at an angle approximate to the perpendicular direction.

If the inclination angle of the long side faces, or the like, is larger than 10 degrees, the rate of light incident on the long side faces, or the like, is lowered. As a result, light supply to a counter end $11d$ side opposite to the incidence side surface $11c$ runs short, so that light emission is apt to be uneven. Also with respect to the sectional shape of the surface light pipe, it is difficult to make the opposite end sides thin, and the quantity of incident light on the irregularities decreases so that efficiency in the light emission is apt to be reduced. Incidentally, the inclination angle of the long side faces, or the like, may be 0 degrees. From the point of view of condensation of output light based on the aforementioned performances such as collimation of transmission light, suppression of leaking light, or the like, it is, however, preferable that the inclination angle is in a range of from 0 (not inclusively) to 8 degrees, particularly in a range of from 0 (not inclusively) to 5 degrees.

From the point of view of visual recognition of a display image through the flat or long side faces of the surface light pipe, etc. in the preferable long side faces, or the like, the angle difference in inclination angles between the long side faces is set to be not larger than 5 degrees, particularly not larger than 4 degrees, more particularly not larger than 3 degrees on the whole of the surface light pipe, and the difference in inclination angle between adjacent ones of the long side faces is set to be not larger than 1 degree, particularly not larger than 0.3 degrees, more particularly not larger than 0.1 degrees.

From the above description, the difference in inclination angle between the long side faces can be prevented from having influence on the display image transmitted through the long side faces when the plane light source unit is used as a front-lighting system for a reflection type liquid-crystal display device. If the deflection in transmission angle of the long side faces varies largely in accordance with the place, the display image is apt to be unnatural. Particularly if the deflection difference between transmission images is large in the vicinity of adjacent pixels, the display image is apt to be remarkably unnatural.

The aforementioned angle difference ininclination angle is determined on the assumption that the inclination angle of the long side faces is not larger than 10 degrees as described above. That is, such a small inclination angle is determined on the assumption that deflection of the display image owing to refraction of light transmitted through the long side faces is suppressed to set the small inclination angle to be in an allowable range. This purpose is that the optimum viewing direction of the reflection type liquid-crystal display device optimized by setting a point of observation in a direction near the perpendicular direction is prevented from being changed.

From the point of view of obtaining a brighter display image, it is preferable that the light output means is provided as irregularities in which the projected area of the long side faces on the reference plane of the light exit surface is not smaller than 8 times, particularly not smaller than 10 times, more particularly not smaller than 15 times as large as that of the short side faces. Hence, a great part of the display image generated by the liquid-crystal cell can be transmitted through the long side faces when the plane light source unit is used as a front-lighting system for a reflection type liquid-crystal display device. On the other hand, when the plane light source unit is used as a back-lighting system for a transmission type liquid-crystal display device, the area of the reflection surface can be kept large. This is favorable for improvement of light utilizing efficiency.

From the point of view of keeping the area of the long side faces large enough to prevent occurrence of moire due to interference with the pixels of the liquid-crystal cell as described above, formability of sharp irregularities, etc., and, in consideration that the pixel pitch of the liquid-crystal cell is generally in a range of from 100 to 300 µm, it is preferable that each of the slopes or short side faces is set to be not larger than 40 µm, particularly in a range of from 3 to 20 µm, more particularly in a range of from 5 to 15 µm in terms of the projected width thereof on the reference plane of the light exit surface.

From the aforementioned point of view, it is preferable that the distance between adjacent short side faces is large. As described above, however, the short side faces serve as a functional portion for substantially outputting light incident on the side surface. Hence, if the distance is too large, illumination becomes so sparse that display may be unnatural. In consideration of these facts, the repetition pitch P (FIG. 3) of the irregularities is preferably set to be in a range of from 50 µm to 1.5 mm. Incidentally, the pitch may be irregular as represented by a random pitch or a random or regular combination of a predetermined number of pitch units. From the point of view of prevention of moire, external appearance, etc., it is, however, preferable that the pitch is constant.

When the light output means is constituted by a repetitive structure of irregularities, moire may occur because of interference between the light output means and the pixels of the liquid-crystal cell. Although prevention of moire can be made by adjustment of the pitch of the irregularities, the pitch of the irregularities is limited to the aforementioned preferable range. Hence, as measures against the case where moire occurs in the pitch range, it is preferable to use a method in which the irregularities are formed to be inclined with respect to the reference plane of the incidence side surface so that the irregularities can be arranged to cross the pixels. On this occasion, if the inclination angle is too large, deflection occurs in reflection by the short side faces. As a result, large deviation occurs in the direction of output light. Hence, anisotropy in the intensity of light emission in the light-transmitting direction of the surface light pipe becomes large, so that light utilizing efficiency is lowered. This is apt to cause lowering of display quality.

From the aforementioned point of view, the inclination angle of the direction of arrangement of the irregularities with respect to the reference plane of the incidence side surface, that is, the inclination angle of the direction of the ridgeline of the irregularities is preferably set to be in a range of ±30 degrees, particularly in a range of ±25 degrees, more particularly in a range of ±20 degrees. Incidentally, the symbol "±" means the direction of inclination with the incidence side surface as a reference. If moire is negligible, it is preferable that the irregularities are arranged to be as parallel with the incidence side surface as possible.

The surface light pipe may be provided as a suitable shape. Hence, the surface light pipe may be an equal thick plate as shown in FIG. 1. It is, however, preferable that the surface light pipe is shaped so that the counter end 11d opposite to the incidence side surface 11c is thinner than the incidence side surface 11c, particularly not thicker than 50% as thick as the incidence side surface 11c. The reduction (wedge-shaping) of the thickness of the counter end permits the efficiency of light incident on the light output means.

That is, light becomes incident efficiently on the light output means formed in one of the upper and lower surfaces until light incident on the incidence side surface reaches the counter end. Then, the light is reflected by the short side faces and exits from the light exit surface which is the other of the upper and lower surfaces. As a result, the incident light can be supplied to a target surface efficiently. There is a further advantage that the weight of the surface light pipe can be reduced by wedge-shaping, or the like. Incidentally, when the surface light pipe is shaped like a wedge constituted by linear faces, the weight of the surface light pipe can be reduced to about 75% as large as the weight of the equal-thick surface light pipe.

The surface light pipe may be formed into a suitable shape also in the case where the surface light pipe is shaped like a wedge, etc. The shape can be determined suitably. For example, a suitable surface shape such as a linear surface, a folded surface or a curved surface may be used. Further, the slopes of irregularities constituting the light output means may be formed into a suitable surface shape such as a linear surface, a folded surface or a curved surface. Further, the irregularities may be constituted by repetition of a combination of irregularities different in shape, etc. in addition to pitch. In addition, the irregularities may be formed as a series of convex or concave portions having ridgelines continuously connected to one another or may be formed as intermittent convex or concave portions discontinuously arranged at intervals of a predetermined distance in the direction of the ridgeline.

The light exit surface of the surface light pipe, that is, either upper or lower surface having no light output means is generally provided as a flat surface. However, when the plane light source unit is used as a front-lighting system for a reflection type liquid-crystal display device so that the surface light pipe is viewed from the upper surface, the light output means may interfere with a pattern of the light output means on the light exit surface so that there is a possibility that a moire phenomenon due to the interference occurs. To prevent lowering of display quality due to the moire, the light exit surface may be provided as a light exit surface structure in which fine irregularities are added as occasion demands.

The formation of the fine irregularities in the light exit surface can be made by a suitable method in accordance with the formation of the background-art diffusing layer. Examples of the method include a surface roughening method using matting such as sand blasting; a method for giving fine irregularities through a mold, or the like, when the surface light pipe is formed; a method for applying a resin layer. containing transparent particles; a method for providing diffusing dots on the surface light pipe or providing a sheet having diffusing dots on the surface light pipe, etc.

In the surface light pipe, the shape of the incidence side surface 11c and the shapes of the left and right side faces 11e and 11f adjacent to the incidence side surface 11c may be determined suitably without any limitation. From the point of view of arrangement of the linear light pipe, the incidence side surface is generally provided as a surface perpendicular to the light exit surface. The left and right side faces adjacent to the incidence side surface are also provided as faces perpendicular to both the incidence side surface and the light exit surface from the point of view of facilitation of connection because the left and right side faces are used as side faces to be connected to the linear light pipe.

On the other hand, the linear light pipe may be constituted by a suitable member that can convert incident light from a point light source into a linear light source and can be connected to the aforementioned surface light pipe, particularly can be partially connected to the surface light pipe. Generally, the linear light pipe is constituted by a rod-like member having at least six faces, namely, upper and lower surfaces $12a$ and $12b$, front and back faces $12c$ and $12d$ and left and right faces $12e$ and $12f$, and having an optical path changing means B by which incident light (14, 15) from one or both of the left and right faces exits from a light supply surface constituted by the back surface $12d$ as shown in FIG. 1.

From the point of view of partial connection to the surface light pipe, efficient entrance of light from the linear light source into the surface light pipe, etc., the linear light pipe to be used is preferably configured so that the optical path changing means B is formed in the front surface $12c$ of the rectangular parallelepiped 12 so as to have vertical slopes as shown in FIG. 1. The slopes surface the left or right surface $12e$ or $12f$ for receiving light from one or both of the point light sources 14 and 15 and are inclined with respect to a reference plane of the back surface $12d$ serving as the light supply surface.

From the above description, light received in one or both of the left and right faces $12e$ and $12f$ of the linear light pipe from the point light sources 14 and 15 is efficiently made incident on the slopes of the optical path changing means formed in the vertical direction between the upper and lower surfaces $12a$ and $12b$. Then, the light is reflected by the slopes, so that the optical path is changed through the reflection. As a result, the light exits efficiently from the light supply surface constituted by the back surface $12d$, with good directivity. In this case, from the point of view of making light exit with good directivity toward the front surface of the surface light pipe, it is preferable that light is supplied to the incidence side surface of the surface light pipe at an angle of not larger than 30 degrees. Hence, the deflection angle of light owing to the change of the optical path through the slopes is preferably in a range of from 70 to 90 degrees. Full reflection is preferable from the point of view of efficient reflection at the large deflection angle. From the point of view of full reflection, it is preferable that the slopes of the optical path changing means face the left or right surface acting as an incident surface of the linear light pipe and have an inclination angle in a range of from 35 to 45 degrees with respect to the reference plane of the back surface serving as a light supply surface.

The optical path changing means may be also formed by a method of providing the whole of the front surface of the linear light pipe as the aforementioned slopes. From the point of view of improvement of light utilizing efficiency, etc., by reducing the thickness in the front-rear surface direction, however, it is preferable that the slopes are formed as a repetitive structure of irregularities in the front surface of the linear light pipe. Each of the irregularities may have a sectional structure of a triangle, a trapezoid, a polygon, or the like. That is, the irregularities have the slopes for changing the optical path of light incident on the left and right side faces to turn the light to the light supply surface (back surface), and flat faces for transmitting the incident light to the other of the left and right side faces. When point light sources are disposed on the left and right faces of the linear light pipe, it is preferable from the point of view of uniformity of exit light that the slopes are provided on the left and right sides by use of a sectional structure of isosceles triangles or trapezoids.

From the point of view of preventing the large angle change of transmission light, it is also preferable that other portions such as upper surfaces of trapezoids than the slopes are provided as flat faces having an inclination angle of not larger than 10 degrees with respect to the reference plane of the light supply surface (back surface). Hence, in consideration of the function of the optical path changing means, the optical path changing means can be also formed by a method in which a repetitive structure of irregularities each having a slope inclined at an inclination angle in a range of from 35 to 45 degrees in accordance with the light output means in the surface light pipe, and a flat surface inclined at an inclination angle of not larger than 10 degrees is provided so that the direction of the ridgelines of the irregularities becomes vertical to the linear light pipe. In this case, the surface in which the optical path changing means is provided may be provided as wedge-like faces or the like in accordance with the surface light pipe.

The repetition pitch of the irregularities for forming the optical path changing means is not particularly limited. From the point of view of uniformity of output light, it is preferable that the pitch is set to be not larger than 1.5 mm, particularly not larger than 1.0 mm, more particularly not larger than 0.5 mm. Incidentally, the pitch may be constant or may be irregular as represented by a random pitch or a random, regular combination of a predetermined number of pitch units or a gradually changed pitch.

The shapes of the upper and lower surfaces $12a$ and $12b$, the back surface $12d$ and the left and right faces $12e$ and $12f$ in the linear light pipe may be determined suitably without any special limitation. Generally, these faces are provided as flat faces from the point of view of arrangement of the linear light pipe with respect to the surface light pipe. Incidentally, the back surface serving as the light supply surface of the linear light pipe may be provided as a diffuse surface structure in which fine irregularities are provided in accordance with the surface light pipe as occasion demands. Generally, from the point of view of keeping the directivity of output light, it is preferable that the back surface is provided as a smooth surface. Incidentally, a suitable reflection plate or reflection layer made of a white film or a silver layer may be disposed on the back of the optical path changing means-forming surface of the linear light pipe so that leaking light can enter the linear light pipe again.

The aforementioned surface light pipe or the linear light pipe can be made of a suitable material exhibiting transparency in accordance with the wave range of the light source. Incidentally, examples of the material to be used in a visible light range include transparent resin such as acrylic resin, polycarbonate resin, polyester resin, norbornene resin, polyolefin resin or epoxy resin, glass, etc. A light pipe made of a material exhibiting no birefringence or small birefringence may be used preferably.

From the point of view of prevention of leaking light, efficiency of total reflection, output angle and efficiency owing to the total reflection, transmission angle, etc., it is preferable that the surface light pipe or the linear light pipe is provided as a light pipe made of a high-refractive-index material. In the case where the light pipe is used in a front-lighting system, surface reflection increases if the refractive index is too high. Hence, it is preferable that the surface light pipe is made of a material exhibiting a refractive index in a range of from 1.48 to 1.58, particularly from 1.49 to 1.54, more particularly from 1.50 to 1.53. On the other hand, in the case where the light pipe is used in a back-lighting system, there is not generated such a problem. Hence, in this case, it is preferable that the surface light pipe is made of a material exhibiting a refractive index of not lower than 1.51, particularly not lower than 1.53, more particularly not lower than 1.55. Incidentally, the linear light pipe can be formed in accordance with the surface light pipe. From the point of view of refractive index, suppression of light absorption, integral formation of the linear and surface light pipes (from one material) based on the former, etc., it is preferable that the linear light pipe is made of a material exhibiting a refractive index in a range of from 1.48 to 1.60.

The surface light pipe or the linear light pipe can be formed by a suitable method such as a cutting method. Examples of the production method preferable from the point of view of mass production include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, ultraviolet rays or radial rays is polymerized in the condition that the fluid resin is cast in a mold capable of forming a predetermined shape or the mold is filled with the fluid resin; and so on.

Incidentally, the surface light pipe or the linear light pipe according to the present invention need not be formed as a monolithic single-layer plate made of one kind of material. For example, the light pipe maybe formed as a laminate of parts made of one kind of material or different kinds of materials. For example, the light pipe may be provided as a plate in which a sheet having a light output means such as irregularities, an optical path changing means or/and fine irregularities (light exit surface, light supply surface) adheres to a light guide portion for performing transmission of light.

The thickness of the surface light pipe or the linear light pipe can be determined suitably in accordance with the size of the surface light pipe, the size of the point light source, etc. in accordance with the purpose of use. Generally, the thickness of the surface light pipe to be used for forming a transmission type or reflection type liquid-crystal display device, or the like, is not larger than 20 mm, particularly in a range of from 0.1 to 10 mm, more particularly in a range of from 0.5 to 8 mm in terms of the thickness of the incidence side surface. Generally, from the point of view of efficiency of light entrance into the surface light pipe, etc., the thickness of the linear light pipe is set to be in a range of from a value equal to the thickness of the surface light pipe to a value 2 times as large as the thickness of the surface light pipe in terms of the thickness of the light supply surface (back surface) of the linear light pipe.

As shown in FIG. 1, the light pipe unit according to the present invention is configured so that the surface light pipe 11 and the linear light pipe 12 are connected to each other through the connected side faces 11e and 11f of the surface light pipe 11 and the light supply surface 12d of the linear light pipe 12. Generally, as shown in FIG. 1, the surface light pipe 11 and the linear light pipe 12 are partially (13) connected to each other in the condition that the incidence side surface 11c of the surface light pipe 11 and the light supply surface (back surface) 12d of the linear light pipe 12 face each other through a gap. By the presence of such a gap, light exiting from the linear light pipe and entering the incidence side surface of the surface light pipe at a large angle is entirely reflected so that the directivity of light incident on the surface light pipe can be enhanced.

The aforementioned connection or partial connection permits the surface light pipe and the linear light pipe to be collectively handled by interposing the presence of the gap. Hence, the linear light pipe is supported by the surface light pipe, so that it becomes unnecessary to provide specially any mechanism for holding the linear light pipe. Moreover, the light supply surface of the linear light pipe can be positioned highly accurately on the incidence side surface of the surface light pipe, so that the efficiency of light exiting from the linear light pipe and entering the surface light pipe can be enhanced.

The partial connection between the connected side faces of the surface light pipe and the light supply surface of the linear light pipe can be made by a suitable method. Hence, the surface light pipe and the linear light pipe may be formed into one body by integral molding into a partially connected state. Alternatively, the surface light pipe and the linear light pipe formed separately can be partially connected to each other through an adhesive agent, or the like. The integral molding has an advantage that the number of assembling parts can be reduced. The separate formation has an advantage that the optical path can be controlled on the basis of the difference between refractive indices of the surface light pipe and the linear light pipe owing to a combination of the surface light pipe and the linear light pipe different in refractive index.

The connection portion and connection structure between the connected side faces of the surface light pipe and the light supply surface of the linear light pipe can be determined suitably without any limitation. From the point of view of prevention of variation in light incident on the incidence side surface 11c of the surface light pipe in the partial connection, the connection structure is preferable as shown in FIGS. 1 and 2. That is, the connected side faces 11e and 11f of the surface light pipe 11 are partially connected to the light supply surface 12d of the long linear light pipe 12 which is longer in effective emission length than the incidence side surface of the surface light pipe in the longitudinal direction through the connecting rods 13 at the outside of the incidence side surface of the surface light pipe. Each of the connecting rods has a widened width portion 13a extended in parallel to the light supply surface of the linear light pipe in the condition that the connecting rod has the same plane as the incidence side surface of the surface light pipe, and a connection portion 13b bent at an extension end of the widened width portion 13a and connected to the light supply surface of the linear light pipe. From the point of view of preventing variation in transmission light, it is particularly preferable that the connecting rods have the same refractive index as that of the surface light pipe and are integrally connected to the surface light pipe so as to be in an optically uniform state.

The size of the aforementioned widened width portion 13a and the size of the aforementioned connection portion 13b in each of the connecting rods can be determined suitably in accordance with connection strength such as characteristic of the surface light pipe supporting the linear light pipe without any limitation. Generally, the thickness of each of the connecting rods is set to be not smaller than 0.5 mm, particularly in a range of from 1 to 20 mm, more particularly in a range of from 2 to 10 mm in terms of the thickness in the vertical direction between the upper and lower surfaces correspondingly to the connected side faces of the surface light pipe and the light supply surface of the linear light pipe. From the point of view of preventing production of shade, preferably, the thickness is set to be as small as possible.

From the point of view of uniformity of light incident on the incidence side surface of the surface light pipe, prevention of production of shade (brightness and darkness) in the light exit surface of the surface light pipe, particularly in an oblique direction, etc., the length of the widened width portion 13a in each of the connecting rods is preferably set as shown in FIG. 2. That is, the short size side extension length x of the widened width portion 13a of at least one of the connecting rods 13 connected to the connected side surfaces 11e and 11f preferably satisfies the expression: $x \geq y \cdot \tan \alpha + d \cdot \tan \beta$ on the basis of $\alpha$ and $\beta$ defined by the expressions: $\sin \alpha = 1/n1 \cdot \sin \beta$ and $\tan \beta = (144 \text{ mm} + w)/250$ mm in the case where the ridgelines of the light output means A of the surface light pipe are parallel to the incidence side surface ($\theta = 0$) when n1 is the refractive index of the surface light pipe 11, w is the longitudinal width of the incidence side surface 11c of the surface light pipe, y is the width of connection in a direction of light transmission between the widened width portion 13a of the connecting rod 13 and a corresponding connected side surface 11e or 11f of the surface light pipe and d is the distance of the gap between the incidence side surface of the surface light pipe and the light supply surface 12d of the linear light pipe 12.

In the above description, from the point of view of light supply to the incidence side surface of the surface light pipe with good uniformity, the optical path changing means in the linear light pipe is preferably formed between the left and right faces 12e and 12f of the linear light pipe so that the extrusion length $\delta$ of the optical path changing means B in the front surface 12c of the linear light pipe 12 from the position corresponding to the extension of each of the connected side faces 11e and 11f of the surface light pipe on a side of at least one connected side surface satisfies the expression: $\delta \geq y \cdot \tan \phi + d \cdot \tan \rho + D \cdot \tan \sigma$ on the basis of $\phi$, $\rho$ and $\sigma$ defined by the expressions: $\sin \phi = 1/n1 \cdot \sin \rho$, $\sin \sigma = 1/n2 \sin \rho$ and $\tan \rho = (144 \text{ mm} + w)/250$ mm when n2 is the refractive index of the linear light pipe and D is the depth of the linear light pipe in the front-rear direction.

On the other hand, in the above description, from the point of view of uniformity of light incident on the incidence side surface of the surface light pipe, prevention of production of shade in the light exit surface of the surface light pipe, particularly in an oblique direction, etc., it is preferable that the short size side extension length x of the widened width portion of at least one of the connecting rods on a side in which the ridgelines of the light output means go away from the incidence side surface satisfies the expression: $x \geq y \cdot \tan \kappa + d \cdot \tan \xi$ on the basis of $\kappa$, $\lambda$ and $\xi$ defined by the expressions: $\kappa = \sin^{-1} (n1 \cdot \sin \lambda)/2 + \theta$, $\tan \lambda = (144 \text{ mm} + w)/250$ mm and $\sin \xi = 1/n1 \cdot \sin \kappa$ in the case where the ridgelines of the light output means A in the surface light pipe 11 are inclined with respect to the incidence side surface ($\theta \neq 0$).

Further, in the above description, from the point of view of light supply to the incidence side surface of the surface light pipe with good uniformity, it is preferable that the optical path changing means in the linear light pipe is formed between the left and right faces 12e and 12f of the linear light pipe so that the extrusion length $\delta$ of the optical path changing means from the position of each connected side surface of the surface light pipe on a side of at least one connected side surface on a side in which the ridgelines of the light output means A go away from the incidence side surface satisfies the expression: $\delta \geq y \cdot \tan \tau + d \cdot \tan \phi + D \cdot \tan \omega$ on the basis of $\tau$, $\phi$ and $\omega$ defined by the expressions: $\tau = \sin^{-1} (n1 \cdot \sin \upsilon)/2 + \theta$, $\tan \upsilon = (144 \text{ mm} + w)/250$ mm, $\sin \phi = 1/n1 \cdot \sin \tau$ and $\sin \omega = 1/n2 \cdot \sin \tau$.

In the above description, the angle is set on the basis of the expression: $(144 \text{ mm} + w)/250$ mm in order to prevent production of shade in a viewing angle range in consideration of the fact that the distance of a view point from a display screen in viewing a portable device is generally not smaller than 250 mm and that the viewing angle in this case is not larger than 30 degrees. However, if the prerequisite varies in accordance with the size of the display screen, etc., the connecting rods can be designed so that shade is hardly produced by use of a suitable numerical value in accordance with the prerequisite.

The plane light source unit according to the present invention is provided for use as a side-lighting type back-lighting or front-lighting system in a transmission type or reflection type liquid-crystal display device. As shown in FIG. 1, the point light sources 14 and 15 are disposed on the linear light pipe 12 of the light pipe unit 1, that is, particularly on one or both of the left and right faces 12e and 12f of the linear light pipe 12. A suitable member such as a light-emitting diode exhibiting light emission characteristic in monochromatic light or in various wave ranges may be used as a point light source in accordance with the purpose of use of the plane light source. When a plurality of point light sources are used, different emission colors may be selected as a combination of different colors in light emission.

The plane light source unit to be used for forming the liquid-crystal display device preferably exhibits light emission characteristic in a visible wave range as wide as possible. The number of point light sources disposed on the left and right faces of the linear light pipe can be determined suitably in accordance with the area of the left ad right faces, etc. As occasion demands, the point light sources may be arranged in parallel so that the point light sources can be controlled to be repeatedly flashed by a suitable method of applying AC of rectangular wave, sine wave, or the like, through an AC power supply. In this case, a continuous light emission state in which blinking is not perceived can be simulated by controlling the flashing cycle, so that greater reduction in The plane light source unit may be formed as a combination in which suitable assisting means such as a light source holder for enclosing the linear light pipe to lead light leaking from the linear light pipe to the incidence side surface of the surface light pipe is arranged as occasion demands. A resin sheet coated with a high-reflectance metal thin film, a sheet of metal foil, a white sheet, or the like, is generally used as the light source holder. When the plane light source unit is used as a back-lighting system, the light source holder may be extended to the light exit surface of the surface light pipe so that the light source holder can serve as a reflection sheet.

The plane light source unit according to the present invention provides a plane light source excellent in brightness because the plane light source unit utilizes light from the point light sources efficiently. It is easy to increase the area of the plane light source unit. Hence, the plane light source unit can be preferably applied to various devices such as a back-lighting system for a transmission type liquid-crystal display device or a front-lighting system for a reflection type liquid-crystal display device. Particularly the plane light source unit can be used preferably in a portable device such as a portable telephone set, an electronic notebook or a PDA which may use a battery such as a storage battery as a motive power source so that power saving can function favorably.

Figure 3:
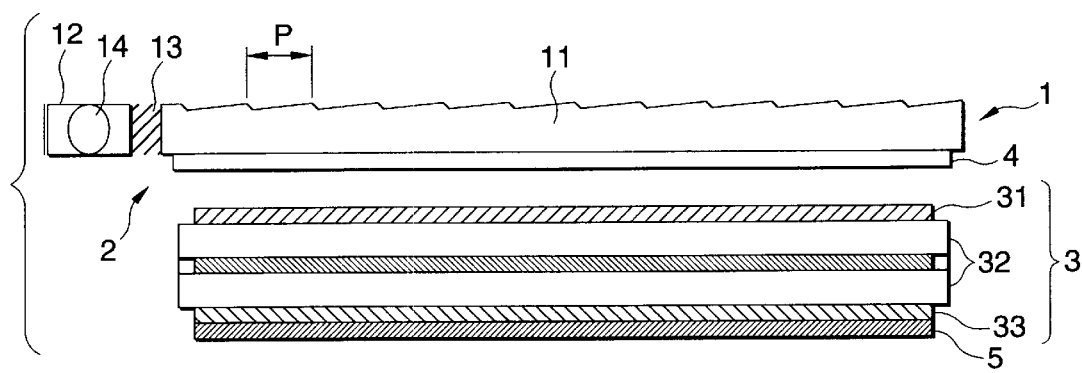
FIG. 3 is a side view of a reflection type liquid-crystal display device using a front-lighting system.

FIG. 3 shows an example of a reflection type liquid-crystal display device using the plane light source unit as a front-lighting system. A reflection type liquid-crystal display unit 3 having polarizing plates 31 and 33 on both sides of a liquid-crystal cell 32 and further having a reflection layer 5 on the back side of the liquid-crystal cell 32 is arranged through a light diffusing layer 4 on the light exit surface side of the surface light pipe 11 in the plane light source unit to thereby form the reflection type liquid-crystal display device. When the plane light source unit is switched off, the liquid-crystal display device can serve as a reflection type liquid-crystal display device using external light.

Figure 4:
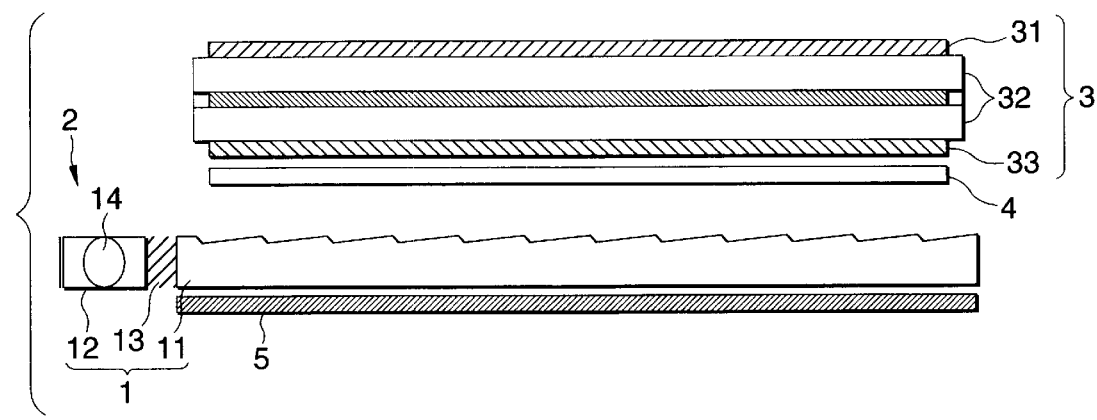
FIG. 4 is a side view of a transmission type (reflection-transmission double type) liquid-crystal display device using a back-lighting system.

On the other hand, FIG. 4 shows an example of a liquid-crystal display device using the plane light source unit as a back-lighting system. A liquid-crystal display unit 3 is disposed through a light diffusing layer 4 on the upper side of the surface light pipe 11 in the plane light source unit to thereby form the liquid-crystal display device. The light pipe unit 1 has a reflection layer 5 on the light exit surface of the surface light pipe 11. Hence, the liquid-crystal display device can serves as a reflection type liquid-crystal display device and also as a transmission type liquid-crystal display device.

As shown in FIGS. 3 and 4, the liquid-crystal display device is at least constituted by the plane light source unit and the liquid-crystal cell and is formed by arrangement of the liquid-crystal cell on a predetermined surface side of the surface light pipe 11 in the plane light source unit. On this occasion, in the reflection type liquid-crystal display device using the plane light source unit as a front-lighting system, the plane light source unit 2 is arranged on the visual side of the liquid-crystal display unit 3 having at its back surface the reflection layer 5 as shown in FIG. 3 so that the light output means-forming surface of the surface light pipe 11 is positioned on the upper side (visual side).

Hence, it is essential to the reflection type liquid-crystal display device using a front-lighting system that at least the liquid-crystal layer of the liquid-crystal cell is positioned between the surface light pipe and the reflection layer in the plane light source unit so that the light output means-forming surface of the surface light pipe is disposed on the visual side. The visual recognition is performed as follows. External light transmitted through the surface light pipe of the plane light source unit or light exiting from the surface light pipe at the time of switching-on is transmitted through the liquid-crystal cell and then turned over by the reflection layer. The turned-over light is transmitted through the liquid-crystal cell again and further transmitted through the surface light pipe. In this manner, the visual recognition is performed. Incidentally, the aforementioned reflection layer may be attached to a cell substrate, or the like, so that the reflection layer can be provided in the inside of the liquid-crystal cell.

On the other hand, in the transmission type liquid-crystal display device using the plane light source unit as a back-lighting system as shown in FIG. 4, the surface light guide of the plane light source unit is disposed on the back side (opposite to the visual side) of the liquid-crystal cell. When the liquid-crystal display device is used as a transmission-reflection double type liquid-crystal display device, the surface light pipe of the plane light source unit is disposed between the liquid-crystal cell and the reflection layer. In these cases, the light output means-forming surface side of the surface light pipe in the plane light source unit may be disposed as the liquid-crystal cell side as shown in FIG. 4 or the light exit surface side of the surface light pipe having no light output means may be disposed as the liquid-crystal cell side reversely to FIG. 4.

In the method in which light is turned over by the reflection layer disposed on the light exit surface so that the light output means-forming surface side of the surface light pipe is disposed as the liquid-crystal cell side as shown in FIG. 4, the optical path length from the light output means to the liquid-crystal cell is increased so that the emission-line pattern due to the light output means can be relaxed. This method has an advantage that occurrence of display failure such as moire can be suppressed compared with the method in which the light exit surface side of the surface light pipe is disposed as the liquid-crystal cell side reversely to FIG. 4.

Viewing the aforementioned transmission type liquid-crystal display device is performed as follows. Light exiting from the plane light source unit enters the liquid-crystal cell directly or through turn-over at the reflection layer, so that the light is transmitted through the liquid-crystal cell. On the other hand, viewing the reflection-transmission double type liquid-crystal display device is performed as follows. In a transmission mode, viewing is performed in the same manner as in the aforementioned transmission type liquid-crystal display device. In a reflection mode, external light is transmitted through the liquid-crystal cell and turned over by the reflection layer on the back of the surface light pipe. The turned-over light is transmitted through the surface light pipe and the liquid-crystal cell again. Thus, viewing is performed.

Generally, the liquid-crystal display device is formed by assembling a liquid-crystal display unit including a liquid-crystal cell 32 having a transparent electrode functioning as a liquid-crystal shutter as shown in FIGS. 3 and 4, a driver attached to the liquid-crystal cell, a polarizing plate, etc.; by assembling a back-lighting or front-lighting system including a change-over switch for changing over light-on/off as occasion demands; and by assembling constituent parts such as a light diffusing layer 4, a reflection layer 5, an anti-reflection layer, a compensatory retarder plate, etc. suitably as occasion demands.

In the present invention, the liquid-crystal display device can be formed in the same manner as in the background art without any limitation except that the aforementioned light pipe unit or plane light source unit is used. Hence, the liquid-crystal cell used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

Incidentally, in FIGS. 3 and 4, the liquid-crystal cell 32 has a liquid-crystal layer enclosed in a cell substrate. In this case, the cell substrate may serve as the light pipe unit according to the present invention or as the surface light pipe of the light pipe unit. In FIGS. 3 and 4, a transparent electrode and a driver attached to the transparent electrode are not shown.

The polarizing plate provided on one or each of the front and rear faces of the liquid-crystal cell is not particularly limited. Particularly from the point of view of obtaining good-contrast-ratio display based on incidence of high-grade linearly polarized light, etc., a member high in degree of polarization such as an absorption type linear polarizer of iodine or dye can be used preferably as the back-lighting side or front-lighting side polarizing plate.

The reflection layer can be formed as a suitable reflection layer according to the background art. Examples of the reflection layer include: a coating layer containing powder of a high-refractive-index metal such as aluminum, silver, gold, copper or chromium in a binder resin; a layer of a metal thin film deposited by a vapor deposition method, or the like; a reflection sheet having the coating or deposited layer supported by a substrate; a sheet of metal foil; and so on. When the reflection layer is provided in the inside of the liquid-crystal cell, the reflection layer is preferably formed by a method of forming an electrode pattern of a high electrically conductive material such as a high-reflectance metal as described above or by a method of providing a transparent electrode pattern on the reflection layer of a high-reflectance metal film through an electrically insulating layer.

Incidentally, the reflection layer in the reflection type liquid-crystal display device may be provided outside the liquid-crystal cell, for example, in the condition that a reflection layer made of a high-reflectance metal film is provided on a plastic film. In the case of a transmission type liquid-crystal display device, on the other hand, the reflection layer may be directly attached to the surface light pipe for forming a back-lighting system. The reflection layer can be provided on either the light output means-forming surface or the light exit surface of the surface light pipe in accordance with the mode of use by a suitable method as described above.

When the liquid-crystal display device is formed, as described above, suitable optical devices such as an anti-glare layer or an anti-reflection layer provided on the visual side surface, a light diffusing plate, a compensatory retarder plate, a polarization separating plate, a prism sheet for controlling an optical path, etc. can be disposed in suitable positions respectively. Incidentally, the anti-reflection layer may be provided on the light exit surface of the surface light pipe.

The aforementioned compensatory retarder plate is provided for compensating for wavelength dependence of birefringence to attain improvement of visibility, or the like. The compensatory retarder plate is disposed between the visual side polarizing plate and the liquid-crystal cell and/or between the back-lighting side polarizing plate and the liquid-crystal cell as occasion demands. A suitable material in accordance with the wave range can be used as the compensatory retarder plate. The compensatory retarder plate can be obtained as a birefringent sheet made of a drawn film of polycarbonate, polysulfone, polyester, polymethyl methacrylate, polyamide, polyvinyl alcohol, or the like, or as a support sheet of a liquid crystal polymer orientation layer. Alternatively, the compensatory retarder plate may be formed as a multilayer of the phase-difference sheets.

The light diffusing layer is provided for obtaining surface light emission of uniform brightness based on prevention of unevenness in brightness, reducing moire based on mixture of adjacent light rays, etc. One light diffusing layer may be disposed in a suitable position of the liquid-crystal display device or a plurality of light diffusing layers may be disposed in suitable positions of the liquid-crystal display device as occasion demands. Incidentally, in FIGS. 3 and 4, the light diffusing layer 4 is disposed between the light pipe unit 1 and the liquid-crystal display unit 3. Incidentally, from the point of view of keeping the directivity of light exiting from the surface light pipe, etc., a diffusing layer having a narrow diffusing range can be used preferably.

The light diffusing layer can be formed by a suitable method in accordance with the fine irregularities of the light exit surface. Examples of the method include: a method of applying and curing a low-refractive-index transparent resin containing high-refractive-index transparent particles dispersed therein; a method of applying and curing a transparent resin containing air bubbles dispersed therein; a method of swelling a surface of a substrate through a solvent to thereby generate a craze; a method of forming a transparent resin layer having an irregular rough surface; and a method using a diffusing sheet formed in the aforementioned manner.

Incidentally, when the transparent type liquid-crystal display device is formed, a polarization separating plate may be disposed between the plane light source unit and a polarizing plate in order to improve brightness. The polarization separating plate has a function of separating natural light into polarized light through transmission and reflection. The polarization separating plate is represented by a sheet having a layer having a cholesteric liquid-crystal phase, particularly having a layer made of a liquid-crystal polymer exhibiting a cholesteric phase, or represented by a dielectric multilayer film provided on a transparent substrate. Incidentally, according to the cholesteric liquid-crystal phase, light can be separated into left and right circularly polarized light groups through transmission and reflection. According to the dielectric multilayer film, light can be separated into linearly polarized P-wave and S-wave light groups through transmission and reflection. Further, the circularly polarized light can be converted into linearly polarized light through a quarter-wave plate.

Therefore, when polarized light transmitted through the polarization separating plate is made incident on a polarizing plate while the axes of polarization are made as coincident as possible, absorption loss owing to the polarizing plate can be suppressed so that improvement of brightness can be achieved. In the plane light source unit constituted by the light pipe unit 1 having at its back the reflection layer 5 as shown in FIG. 4, polarized light reflected by the aforementioned polarization separating plate can be turned over by the reflection layer 5 and made to enter the polarization separating plate again. Hence, the turned-over light can be partially or wholly transmitted, so that improvement of brightness can be achieved by improvement of light utilizing efficiency.

According to the present invention, optical devices or parts such as a light pipe unit, a liquid-crystal cell, a polarizing plate, etc. for forming the aforementioned plane light source unit or the liquid-crystal display device may be wholly or partially integrally laminated/fixed onto one another or may be disposed easily separably. From the point of view of prevention of lowering of contrast based on suppression of surface reflection, etc., it is preferable that such parts are fixed onto one another. A suitable transparent adhesive agent such as a tackifier can be used for the fixing process.

Figure 5:
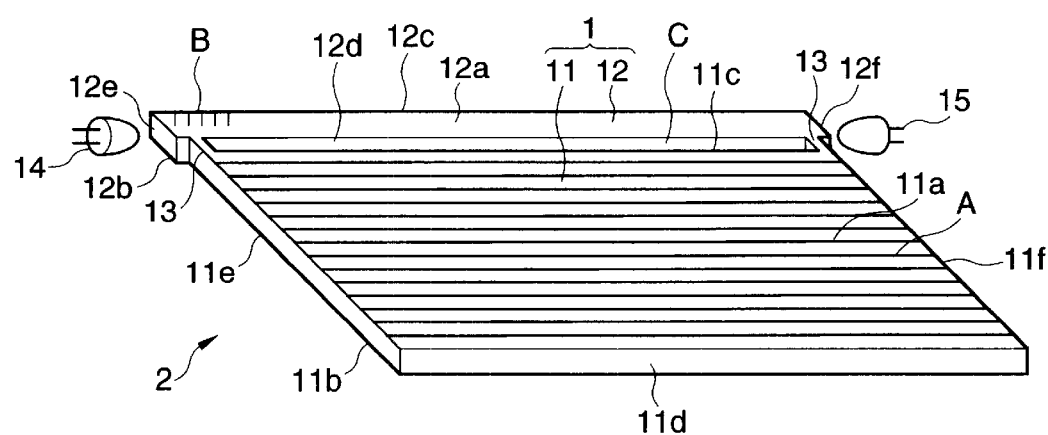
FIG. 5 is a perspective view of another plane light source unit (light pipe unit)
Figure 6:
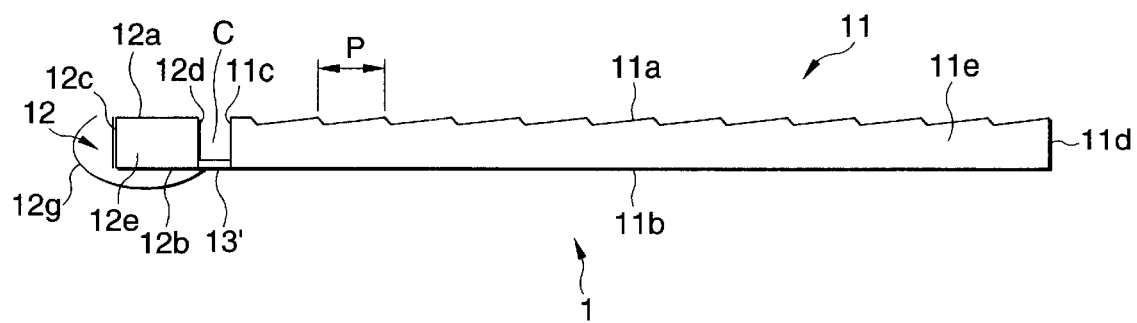
FIG. 6 is aside view of a still another plane light source unit (light pipe unit)

FIGS. 5 to 8 show other examples of a light pipe unit and a liquid-crystal display device according to the present invention. The light pipe unit comprises a linear light pipe for converting incident light from a point light source into a linear light source, and a surface light pipe for converting incident light from the linear light source into a plane light source, the linear light pipe and the surface light pipe being partially connected to each other. FIGS. 5 and 6 show examples of such a light pipe unit. The reference numeral 1 designates a light pipe unit; 11, a surface light pipe; 12, a linear light pipe; and 13, 13', connection portions. Incidentally, FIG. 5 shows the case where the light pipe unit 1 is applied to a plane light source unit 2. The reference numeral 14, 15 designates a point light source. Other parts common with the aforementioned examples in FIGS. 1 to 4 are designated by the same reference numerals in FIGS. 1 to 4.

The light pipe unit according to the present invention is configured so that the surface light pipe 11 and the linear light pipe 12 are partially connected to each other. As shown in FIG. 5, the surface light pipe 11 and the linear light pipe 12 are partially connected to each other in the condition that the incidence side surface 11c of the surface light pipe 11 and the back surface 12d of the linear light pipe 12 face each other through a gap C. By the presence of such a gap C, light exiting from the linear light pipe and entering the incidence side surface of the surface light pipe at a large angle is entirely reflected so that the directivity of light incident on the surface light pipe can be enhanced.

The portions of connection between the surface light pipe and the linear light pipe can be determined suitably. It is, however, preferable that the connection width of the connection portions is as narrow as possible because light leaking from the portions of connection is apt to cause lowering of efficiency of light incident on the incidence side surface of the surface light pipe. A partially connecting method using the peripheral portion of the incidence side surface of the surface light pipe is employed preferably from the point of view of efficiency of incidence of light, etc.

When the peripheral portion of the aforementioned incidence side surface is used for connection, from the point of view of keeping the incidence area in the incidence side surface of the surface light pipe, supporting the linear light pipe, etc., it is preferable that the surface light pipe and the linear light pipe are connected to each other through portions 13 which are not thicker than 2 mm, particularly not thicker than 1 mm, more particularly not thicker than 0.5 mm at longitudinally opposite ends of the incidence side surface of the surface light pipe as shown in FIG. 1, or portions 13' which are not thicker than ¼, particularly not thicker than ⅙, more particularly not thicker than 1/10 as thick as one or both of the upper and lower surfaces as shown in FIG. 6.

Figure 7:
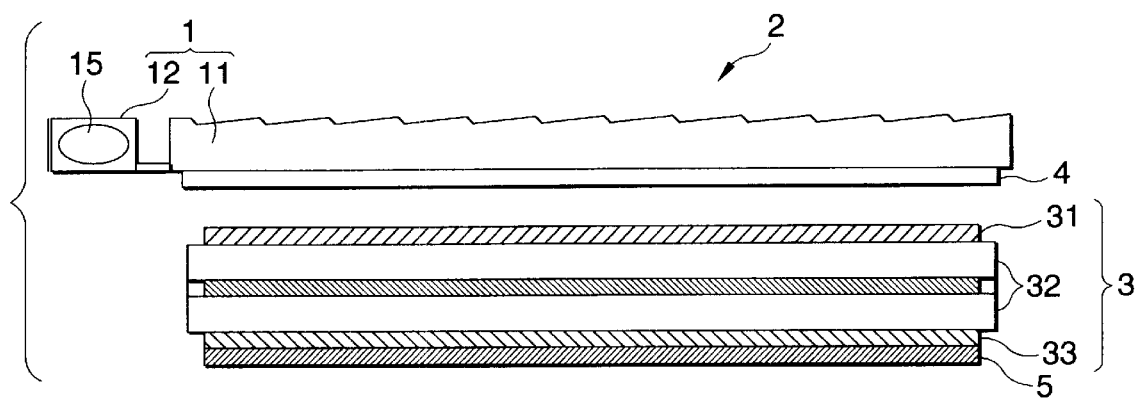
FIG. 7 is a side view of another reflection type liquid-crystal display device using a front-lighting system.
Figure 8:
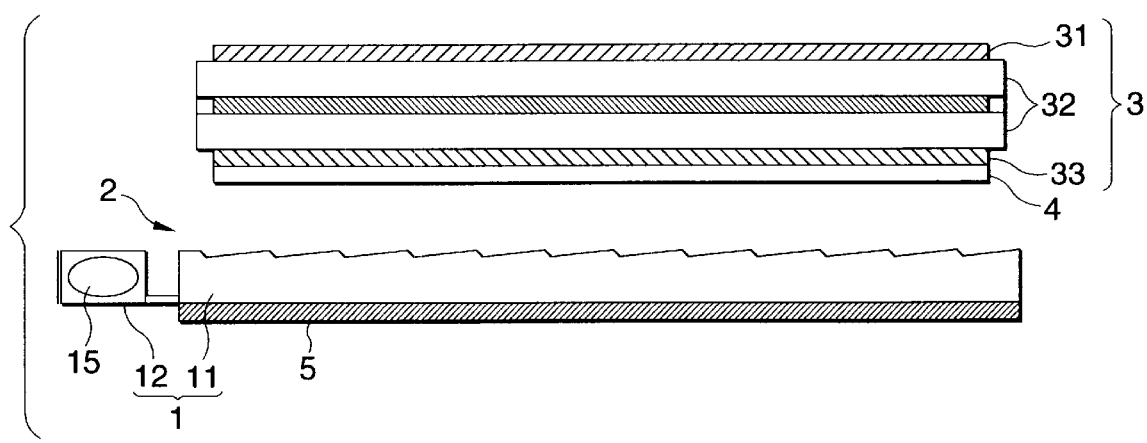
FIG. 8 is a side view of another transmission type (reflection-transmission double type) liquid-crystal display device using a back-lighting system.

Incidentally, reference numeral 12g in FIG. 6 designates a light source holder for enclosing the linear light pipe 12 to lead light leaking from the linear light pipe to the incidence side surface of the surface light pipe. FIG. 7 and FIG. 8 respectively show a reflection type liquid-crystal display device using a front-lighting system and a transmission type (reflection-transmission double type) liquid-crystal display device using a back-lighting system, both of these liquid-crystal display devices use the light pipe unit shown in FIG. 5 or FIG. 6.

EXAMPLE 1

A mold processed into a predetermined shape in advance was filled with hot-melted polymethyl methacrylate of high fluidity and then cooled to thereby integrally mold a light pipe unit in which an incidence side surface of a surface light pipe and a back surface of a linear light pipe were partially connected to each other through a gap of 0.8 mm by 1 mm-thick portions at left and right ends of the incidence side surface.

Incidentally, the aforementioned surface light pipe was made of a plate-like member 40 mm wide and 25 mm deep. The plate-like member had an incidence side surface 1 mm thick, and a counter end 0.6 mm thick. The plate-like member had flat upper and lower surfaces. Prism-like irregularities parallel to the incidence side surface were formed in the upper surface of the plate-like member so as to be disposed at intervals of a pitch of 210 $\mu$m. Each of the prism-like irregularities had a combination of a short side surface and a long side surface. The inclination angle of the short side faces facing the incidence side surface was in a range of from 42.5 to 43 degrees. The inclination angle of the long side faces was in a range of from 1.8 to 3.5 degrees. The inclination angle difference between adjacent ones of the long side faces was not larger than 0.1 degrees. The projected width of each of the short side faces on the lower surface was in a range of from 10 to 16 $\mu$m. The ratio of the projected area of the long side faces on the lower surface to the projected area of the short side faces on the lower surface was not lower than 12. The prism-like irregularities were formed to start from a position far by 2 mm from the incidence side surface.

On the other hand, the linear light pipe was made of a rectangular parallele piped having a width of 43 mm (left-right direction), a depth of 2.4 mm (front-rear direction) and a thickness of 1 mm (up-down direction). The linear light pipe had at its front surface an optical path changing means for changing an optical path in up-down direction. The optical path changing means was constituted by prism-like grooves each having a vertical angle of 94 degrees and a depth of 20 $\mu$m. Each of the prism-like grooves had a combination of a steep slope and an easy slope. The prism-like grooves were formed on the whole left and right widthwise regions so as to be disposed at intervals of a pitch of 200 $\mu$m.

Two white light-emitting diodes were disposed on the left and right faces, respectively, of the linear light pipe in the aforementioned light pipe unit while the periphery of each light-emitting diode was fixed by an adhesive tape. The light-emitting diodes were connected to a DC power supply. Thus, a plane light source unit was obtained.

EXAMPLE 2

A plane light source unit was obtained in the same manner as in Example 1 except that the surface light pipe and the linear light pipe were partially connected to each other in the width direction through a 0.2 mm-thick layer by use of a side which was of the incidence side surface of the surface light pipe and which had no light output means.

EXAMPLE 3

A plane light source unit was obtained in the same manner as in Example 1 except that the thickness of the connection portions at the left and right ends of the incidence side surface was set to be 0.5 mm.

EXAMPLE 4

A plane light source unit was obtained in the same manner as in Example 1 except that the surface light pipe and the linear light pipe were formed separately and then the incidence side surface of the surface light pipe and the back surface of the linear light pipe were merely butt-arranged.

EXAMPLE 5

A normally white reflection type liquid-crystal display unit was disposed on a table. The plane light source unit obtained in Example 1 was disposed on the upper side of the liquid-crystal display unit. Thus, a reflection type liquid-crystal display device using a front-lighting system was obtained. Incidentally, the light pipe unit was disposed so that the light output means-forming surface of the surface light pipe was located on the visual side.

EXAMPLE 6

A reflection type liquid-crystal display device using a front-lighting system was obtained in the same manner as in Example 5 except that the plane light source unit obtained in Example 2 was used.

EXAMPLE 7

A reflection type liquid-crystal display device using a front-lighting system was obtained in the same manner as in Example 5 except that the plane light source unit obtained in Example 3 was used.

EXAMPLE 8

A trial was made to produce a reflection type liquid-crystal display device using a front-lighting system in the same manner as in Example 5 except that the plane light source unit obtained in Example 4 was used. As a result, it was impossible to dispose the linear light pipe on the liquid-crystal display unit.

Evaluation Test 1

The reflection type liquid-crystal display device obtained in each of Examples 5 to 8 was evaluated as follows. The plane light source unit was switched on in the condition that the liquid-crystal cell was supplied with no voltage. The frontal brightness of the center portion of the device was examined by a brightness meter (BM7, made by Topcon Corp.) Results of the evaluation were shown in Table 1.

TABLE 1

| | Example 5 | Example 6 | Example 7 | Example 8 |
|---|---|---|---|---|
| Frontal Brightness (cd/m²) | 24 | 21 | 16 | — |

EXAMPLE 9

A silver reflection plate having light diffuse reflecting characteristic was bonded, through an adhesive layer, to the light exit surface of the surface light pipe in the plane light source unit obtained in Example 1. The plane light source unit was placed on a table. A transmission type liquid-crystal display unit was disposed on the light output means-forming surface of the surface light pipe. Thus, a transmission type liquid-crystal display device using a back-lighting system was obtained.

EXAMPLE 10

A transmission type liquid-crystal display device using a back lighting system was obtained according to Example 9 except that the plane light source of Example 2 was used.

EXAMPLE 11

A transmission type liquid-crystal display device using a back lighting system was obtained according to Example 9 except that the plane light source of Example 3 was used.

EXAMPLE 12

A transmission type liquid-crystal display device using a back lighting system was obtained according to Example 9 except that the plane light source of Example 4 was used.

Evaluation Test 2

The transmission type liquid-crystal display device obtained in each of Examples 9 to 12 was evaluated as follows. The plane light source unit was switched on in the condition that the liquid-crystal cell was supplied with no voltage. The frontal brightness of the center portion of the device was examined by a brightness meter (BM7, made by Topcon Corp.). Results of the evaluation were shown in Table 2.

TABLE 2

| | Example 9 | Example 10 | Example 11 | Example 12 |
|---|---|---|---|---|
| Frontal Brightness (cd/m²) | 28 | 24 | 18 | 25*1 |

*1: This was a value in the case where the surface light pipe and the linear light pipe were positioned strictly by the butt arrangement of the incidence side surface of the surface light pipe and the back surface of the linear light pipe and fixed/held so that the state of the arrangement was not collapsed when the plane light source unit was disposed on the table.

EXAMPLE 13

The plane light source unit obtained in Example 1 was placed on a table so that the light output means-forming surface of the surface light pipe was located on the lower side. A transmission type liquid-crystal display unit was disposed on the light exit surface of the surface light pipe through a light diffusing film with a haze of 83%. Thus, a transmission type liquid-crystal display device using a back-lighting system was obtained.

EXAMPLE 14

A transmission type liquid-crystal display device using a back lighting system was obtained according to Example 13 except that the plane light source of Example 2 was used.

EXAMPLE 15

A transmission type liquid-crystal display device using a back lighting system was obtained according to Example 13 except that the plane light source of Example 3 was used.

EXAMPLE 16

A transmission type liquid-crystal display device using a back lighting system was obtained according to Example 13 except that the plane light source of Example 4 was used.

Evaluation Test 3

The transmission type liquid-crystal display device obtained in each of Examples 13 to 16 was evaluated as follows. The plane light source unit was switched on in the condition that the liquid-crystal cell was supplied with no voltage. The frontal brightness of the center portion of the device was examined by a brightness meter (BM7, made by Topcon Corp.) Results of the evaluation were shown in Table 3.

TABLE 3

|  | Example 13 | Example 14 | Example 15 | Example 16 |
|---|---|---|---|---|
| Frontal Brightness (cd/m$^2$) | 30 | 27 | 21 | 28*2 |

*2: This was a value in the case where the surface light pipe and the linear light pipe were positioned strictly by the butt arrangement of the incidence side surface of the surface light pipe and the back surface of the linear light pipe and fixed/held so that the state of the arrangement was not collapsed when the plane light source unit was disposed on the table.

and the linear light pipe were positioned strictly by the butt arrangement of the incidence side surface of the surface light pipe and the back surface of the linear light pipe and fixed/held so that the state of the arrangement was not collapsed when the plane light source unit was disposed on the table.

In the above description, in Examples 12 and 16, the brightness varied widely in accordance with the distance and position in the arrangement of the surface light pipe and the linear light pipe. When the surface light pipe and the linear light pipe were not strictly positioned, Examples 12 and 16 were inferior to the other Examples. Incidentally, in Example 8, the frontal brightness was 22 cd/m$^2$ when the surface light pipe and the linear light pipe were positioned strictly and fixed/held so that the state of the arrangement was not collapsed. However, when the fixed/held state was changed by vibration, or the like, the brightness was lowered remarkably.

In Examples 5 to 7, Examples 9 to 11 and Examples 13 to 15, a good light emission state could be obtained when the plane light source unit was disposed merely in the same manner as the general light pipe. It was unnecessary to provide any means for fixing/holding the plane light source unit. Incidentally, in Example 5 using a front-lighting system, linear thin shade was produced in end portions of the surface light pipe because of the influence of the connection portions. In Example 6, production of shade was little observed. In Example 7, display was dark and stripe display unevenness was produced in a direction parallel to the linear light pipe because of light leaking from the connection portions. As a result, it was hard to view the display.

In Examples 9 and 13 using a back-lighting system, production of shade as produced in Example 5 was not observed. In comparison between Examples 7 and 11 and between Examples 14 and 15, uniform and bright display was obtained in Examples 7 and 14 whereas weak stripe display unevenness was produced to make display dark in Examples 11 and 15. It is apparent from the above description that, in the light pipe unit according to the present invention, point light sources as single parts requiring no alignment can be converted into a uniform plane light source easily to thereby make it possible to form a reflection type or transmission type liquid-crystal display device which uses a front-lighting or back-lighting system and which is good in display quality.

EXAMPLE 17

A mold processed into a predetermined shape in advance was filled with hot-melted polymethyl methacrylate of high fluidity. Then, the polymethyl methacrylate was cooled to obtain a light pipe unit integrally molded laterally symmetrically as follows. That is, the light pipe unit was obtained as a light pipe unit comprising a surface light pipe and a linear light pipe. The surface light pipe was constituted by a plate-like member which was 40 mm wide and 25 mm deep and which had an incidence side surface 1 mm thick and a counter side surface 0.6 mm thick. The linear light pipe was made of a rectangular parallelepiped which was 46 mm wide (left-right direction), 2.4 mm deep (front-rear direction) and 1 mm thick (up-down direction). The surface light pipe and the linear light pipe were partially connected to each other by 1 mm-thick connecting rods (13) through the incidence side surface of the surface light pipe and the light supply surface (back surface) of the linear light pipe. Incidentally, each of the connecting rods had a widened width portion (13a), and a connection portion (13b). The widened width portion (13a) had a connection width (y) of 1 mm and had the same plane as the incidence side surface of the surface light pipe at each of left and right ends of the incidence side surface. The connection portion (13b) was protruded outward by a short size side extension length (x) of 1.5 mm through the widened width portion (13a) and bent at the extension end so as to be connected to the light supply surface of the linear light pipe. A distance (d) of 0.7 mm was formed between the incidence side surface of the surface light pipe and the light supply surface of the linear light pipe.

Incidentally, the aforementioned surface light pipe was made of a plate-like member having flat upper and lower surfaces and having, at its upper surface, prism-like irregularities. The prism-like irregularities were arranged at intervals of a pitch of 210 μm so as to be parallel to the incidence side surface of the surface light pipe. The inclination angle of the short side faces facing the incident side surface was in a range of from 42.5 to 43 degrees. The inclination angle of the long side faces was in a range of from 1.8 to 3.5 degrees. The inclination angle difference between adjacent ones of the long side faces was not larger than 0.1 degrees. The projected width of each of the short side faces on the lower surface was in a range of from 10 to 16 μm. The ratio of the projected area of the long side faces on the lower surface to the projected area of the short side faces on the lower surface was not lower than 12. The prism-like irregularities were disposed from a position far by 2 mm from the incidence side surface.

The linear light pipe had, at its front surface, up/down direction optical path changing means made of prism-like grooves. Each of the prism-like grooves was constituted by a combination of a steep slope and an easy slope. Each of the prism-like grooves had a vertical angle of 94 degrees and a depth of 20 μm. The prism-like grooves were disposed at intervals of a pitch of 200 μm from positions far by 0.5 mm from the left and right widthwise end portions respectively. Hence, the extrusion distance (δ) of the optical path changing means from each position corresponding to the incidence side surface was 2.5 mm. Incidentally, the calculated values of x and δ were 0.95 mm and 2.0 mm respectively when the refractive index was 1.5.

Two white light-emitting diodes were disposed in center portions of the left and right faces of the linear light pipe in the aforementioned light pipe unit by a method of fixing the periphery of each light-emitting diode by use of an adhesive tape. The light-emitting diodes were connected to a DC power supply. Thus, a plane light source unit was obtained. Then, a normally white reflection type liquid-crystal display unit was disposed on the light exit surface (lower surface) side of the plane light-source unit. Thus, a reflection type liquid-crystal display device using a front-lighting system was obtained. That is, the light pipe unit was disposed so that the light output means-forming surface of the surface light pipe was located on the visual side.

EXAMPLE 18

A light pipe unit was obtained in the same manner as in Example 17 except that the prism-like irregularities of the surface light pipe were inclined up rightward at an angle of 23 degrees with respect to the incidence side surface, except that the linear light pipe was extruded by 4 mm on the incidence side surface side in the left of the prism-like irregularities, except that the short size side outward extension length (x) in the widened width portions of the linear light pipe was set to be 2.5 mm, and except that the optical path changing means of the linear light pipe was formed to start from a position extruded by 3.5 mm from a position corresponding to the left incidence side surface. A plane light source unit and a reflection type liquid-crystal display device using a front-lighting system were obtained by use of the light pipe unit. Incidentally, the calculated values of x and δ were 2.06 mm and 3.1 mm respectively when the refractive index was 1.5.

Comparative Example 1

A light pipe unit was obtained in the same manner as in Example 17 except that connection through the connecting rods was replaced by connection through left and right end portions of the incidence side surface with a thickness of 1 mm and a distance of 0.7 mm. A plane light source unit and a reflection type liquid-crystal display device using a front-lighting system were obtained by use of the light pipe unit. Incidentally, the linear light pipe was extruded by 3.5 mm at each of the left and right ends of the surface light pipe. The optical path changing means was formed to start from a position extruded by 2.5 mm from a position corresponding to the incidence side surface.

Comparative Example 2

A light pipe unit was obtained in the same manner as in Example 18 except that connection through the connecting rods was replaced by connection through left and right end portions of the incidence side surface with a thickness of 1 mm and a distance of 0.7 mm. A plane light source unit and a reflection type liquid-crystal display device using a front-lighting system were obtained by use of the light pipe unit. Incidentally, the linear light pipe was extruded by 3.5 mm at each of the left and right ends of the surface light pipe. The optical path changing means was formed to start from a position extruded by 2.5 mm from a position corresponding to the incidence side surface.

Evaluation Test 4

The light emission state of the reflection type liquid-crystal display device obtained in each of Examples and Comparative Examples was observed in the condition that the plane light source unit was switched on while the liquid-crystal cell was supplied with no voltage. As a result, in Comparative Examples, shade and emission line were extended from the connection portion of the linear light pipe. In Comparative Example 1, the shade and emission line were extended in parallel to the left and right side faces of the surface light pipe on the left and right side faces in frontal viewing. Moreover, the shade and emission line were moved gradually on one side because of the change of the viewing angle owing to oblique viewing, so that the shade and emission line were observed visually. In Comparative Example 2, also in frontal viewing, shade and emission line were produced obliquely with the left connection portion as a start point and perpendicularly to the prism direction. As a result, when the viewing point moved left, the shade and emission line on the left side surface were moved right toward the side surface gradually. When the viewing point moved right, the shade and emission line were moved toward the center. As a result, the shade and emission line were observed visually remarkably. The production of the shade and emission line in Comparative Example 2 was sharper than that in Comparative Example 1. In Comparative Example 2, display was poor.

On the other hand, in Examples, the production of shade and emission line was so thin that there was no problem in practical use. Moreover, the liquid-crystal display device was excellent in uniformity of light emission on the whole surface and bright. The light emission state in Example 17 was better than that in Example 18. It is apparent from the above description that, in the light pipe unit according to the present invention, point light sources as single parts requiring no alignment can be converted into a uniform plane light source easily to thereby make it possible to form a reflection type or transmission type liquid-crystal display device which uses a front-lighting or back-lighting system and which is excellent in uniformity of light emission and good in display quality.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe unit comprising:
   a surface light pipe including upper and lower surfaces and connected side surfaces constituted by an incident side surface formed between said upper and lower surfaces and side surfaces adjacent to said incident side surface; and
   a linear light pipe including a light supply surface,
      wherein said surface light pipe is connected to said linear light pipe through said connected side surfaces and said light supply surface so that said linear light pipe converts incident light from a point light source into a linear light source and outputs the light of said linear light source through said light supply surface, and said surface light pipe converts incident light from said linear light source into a plane light source.

2. A light pipe unit according to claim 1, wherein said surface light pipe includes light output means in one of said upper and lower surfaces by which incident light from said incidence side surface goes out to the other of said upper and lower surfaces; said linear light pipe is constituted by a rod-like member having at least six surfaces composed of upper and lower surfaces, front and back faces and left and right faces and further having an optical path changing means formed in said front surface by which light incident on either one or both of said left and right faces exits from said light supply surface constituted by said back surface; and said incidence side surface of said surface light pipe and said light supply surface of said linear light pipe are made to face each other through a distance.

3. A light pipe unit according to claim 2, wherein said light output means of said surface light pipe includes slopes facing said incidence side surface at an inclination angle in a range of from 35 to 45 degrees with respect to a reference plane acting as a light exit surface on a side opposite to one of said upper and lower surfaces having said light output means, and flat faces inclined at an inclination angle of not larger than 10 degrees so that a projected area of said flat faces on said reference plane is not smaller than 8 times as large as a projected area of said slopes on said reference plane; and wherein said linear light pipe is shaped like a rectangular parallelepiped; said optical path changing means formed in said front surface of said linear light pipe has slopes facing either one of said left and right faces and inclined vertically with respect to a reference plane of said back surface.

4. A light pipe unit according to claim 2, wherein said light output means of said surface light pipe is constituted by a repetitive structure of prism-like irregularities each having a combination of a short side surface and a long side surface and disposed at intervals of a pitch in a range of from 50 μm to 1.5 mm; each of said short side faces is made of a slope facing said incidence side surface at an inclination angle in a range of from 35 to 45 degrees with respect to a reference plane on a side which acts as a light exit surface and which is opposite to one of said upper and lower surfaces having said light output means; and each of said long side faces is constituted by a slope inclined with respect to said reference plane with an inclination angle in a range of from 0 (not inclusively) to 10 degrees, so that the inclination angle difference as a whole is not larger than 5 degrees, so that the inclination angle difference between adjacent ones of said long side faces is not larger than 1 degree, and so that a projected area of the long side faces on said reference plane is not smaller than 8 times as large as a projected area of the short side faces on said reference plane.

5. A light pipe unit according to claim 3, wherein a projected width of each of said slopes or short side faces on said reference plane is not larger than 40 μm.

6. A light pipe unit according to claim 2, wherein said light output means of said surface light guide plane is constituted by a repetitive structure disposed at regular intervals of a pitch in a range of from 50 μm to 1.5 mm.

7. A light pipe unit according to claim 2, wherein light output means of said surface light pipe has ridgelines parallel or inclined within an angle range of ±30 degrees with respect to said incidence side surface.

8. A light pipe unit according to claim 1, wherein a ratio of thickness of said light supply surface of said linear light pipe to thickness of said incidence side surface of said surface light pipe is in a range of from 1 to 2.

9. A light pipe unit according to claim 1, wherein: said surface light pipe and said linear light pipe are integrated with each other as an integrally molded product.

10. A light pipe unit according to claim 1, wherein said light supply surface of said linear light pipe is longer than said incidence side surface of said surface light pipe in its longitudinal direction and is partially connected to said connected side faces of said surface light pipe through connecting rods; and each of said connecting rods includes a widened width portion which extends in parallel to said light supply surface of said linear light pipe, in a state that said connecting rod has one and the same plane as said incidence side surface of said surface light pipe, and includes a connection portion which is bent at an extension end of said widened width portion and connected to said light supply surface of said linear light pipe.

11. A light pipe unit according to claim 10, wherein said surface light pipe has a refractive index which is equal to that of said connecting rods; and the short size side extension length x of at least one of said connecting rods satisfies the expression $x \geq y \cdot \tan \alpha + d \cdot \tan \beta$ on the basis of $\alpha$ and $\beta$ which are defined by the expressions $\sin \alpha = 1/n1 \cdot \sin \beta$ and $\tan \beta = (144 \text{ mm}+w)/250 \text{ mm}$ in the case where the ridgelines of said light output means of said surface light pipe are parallel to said incidence side surface ($\theta=0$) when n1 is a refractive index of said surface light pipe, w is a longitudinal width of said incidence side surface of said surface light pipe, y is a width of connection in a direction of light transmission between said connected width portion of said connecting rod and said connected side surface of said surface light pipe, and d is a distance between said incidence side surface of said surface light pipe and said light supply surface of said linear light pipe.

12. A light pipe unit according to claim 11, wherein the extrusion length δ of said optical path changing means of said linear light pipe from a position of each connected side surface of said surface light pipe on a side of at least one connected side surface satisfies the expression $\delta \geq y \cdot \tan \phi + d \cdot \tan \rho + D \cdot \tan \sigma$ on the basis of $\phi$, $\rho$ and $\sigma$ which are defined by the expressions $\sin \phi = 1/n1 \cdot \sin \rho$, $\sin \sigma = 1/n2 \cdot \sin \rho$ and $\tan \rho = (144 \text{ mm}+w)/250 \text{ mm}$ when n2 is a refractive index of said linear light pipe and D is a length of the linear light pipe in a front/rear direction.

13. A light pipe unit according to claim 10, wherein said surface light pipe has the same refractive index as that of said connecting rods; and a short size side extension length x of said widened width portion of said connecting rods at least on a side where ridgelines of said light output means go away from said incidence side surface satisfies the expression $x \geq y \cdot \tan \kappa + d \cdot \tan \xi$ on the basis of $\kappa$, $\lambda$, and $\xi$ which are defined by the expressions $\kappa = \sin^{-1}(n1 \cdot \sin \lambda)/2 + \theta$, $\tan \lambda = (144 \text{ mm}+w)/250 \text{ mm}$ and $\sin \xi = 1/n1 \cdot \sin \kappa$ in the case where the ridgelines of said light output means of said surface light pipe are inclined with respect to said incidence side surface ($\theta \neq 0$) when n1 is a refractive index of said surface light pipe, w is a longitudinal width of said incidence side surface of said surface light pipe, y is a width of connection in a direction of light transmission between said widened width portion of said connecting rod and a corresponding connected side surface of said surface light pipe, and d is a distance between said incidence side surface of said surface light pipe and said light supply surface of said linear light pipe.

14. A light pipe unit according to claim 13, wherein an extrusion length δ of said optical path changing means of said linear light pipe from a position of each connected side surface of said surface light pipe at least on a side in which ridgelines of said light output means go away from said incidence side surface satisfies the expressions $\delta \geq y \cdot \tan \tau + d \cdot \tan \phi + D \cdot \tan \omega$ on the basis of $\tau$, $\phi$ and $\omega$ which are defined by the expressions $\tau = \sin^{-1}(n1 \cdot \sin \nu)/2 + \theta$, $\tan \nu = (144 \text{ mm}+w)/250 \text{ mm}$, $\sin \phi = 1/n1 \cdot \sin \tau$ and $\sin \omega = 1/n2 \cdot \sin \tau$ when n2 is a refractive index of said linear light pipe and D is a length of the linear light pipe in a front/rear direction.

15. A plane light source unit comprising a light pipe unit according to claim 1, wherein a point light source is disposed on said linear light pipe of said light pipe unit.

16. A liquid-crystal display device comprising a plane light source unit according to claim 15, and a liquid crystal cell.

17. A light pipe unit comprising:
a linear light pipe for converting incident light from a point light source into a linear light source; and
a surface light pipe for converting incident light from said linear light source into a plane light source, said linear light pipe and said surface light pipe being partially connected to each other.

18. A light pipe unit according to claim 17, wherein said surface light pipe is, constituted by a plate-like member having at least an upper surface, a lower surface and an incidence side surface which is one of side faces between said upper surface and said lower surface and further having a light output means formed in one of said upper and lower surfaces so that light incident on said incidence side surface goes out from the other of said upper and lower surfaces; said linear light pipe is constituted by a rod-like member having at least six surfaces, namely, upper and lower faces, front and back faces and left and right faces and further having a light path changing means formed in said front surface so that light incident on one or both of said left and right faces exits from said back surface; and said incidence side surface of said surface light pipe and said back surface of said linear light pipe are partially connected to each other in a condition that said incidence surface and said back surface are in opposition to each other through a gap.

19. A light pipe unit according to claim 18, wherein said light output means in said surface light pipe includes slopes facing said incidence side surface at an inclination angle in a range of from 35 to 45 degrees with respect to a reference plane acting as a light exit surface on a side opposite to one of said upper and lower surfaces having said light output means, and flat faces inclined at an inclination angle of not larger than 10 degrees so that a projected area of said flat faces on said reference plane is not smaller than 8 times as large as a projected area of said slopes on said reference plane; and wherein: said linear light pipe is shaped like a rectangular parallelepiped; said optical path changing means formed in said front surface of said linear light pipe has slopes facing either one of said left and right faces and inclined vertically with respect to a reference plane of said back surface.

20. A light pipe unit according to claim 18, wherein said light output means in said surface light pipe is constituted by a repetitive structure of prism-like irregularities each having a combination of a short side surface and a long side surface and disposed at intervals of a pitch in a range of from 50 $\mu$m to 1.5 mm; each of said short side faces is made of a slope facing said incidence side surface at an inclination angle in a range of from 35 to 45 degrees with respect to a reference plane on a side which acts as a light exit surface and which is opposite to one of said upper and lower surfaces having said light output means; and each of said long side faces is constituted by a slope inclined with respect to said reference plane with an inclination angle in a range of from 0 (not inclusively) to 10 degrees, so that the inclination angle difference as a whole is not larger than 5 degrees, so that the inclination angle difference between adjacent ones of said long side faces is not larger than 1 degree, and so that a projected area of the long side faces on said reference plane is not smaller than 8 times as large as a projected area of the short side faces on said reference plane.

21. A light pipe unit according to claim 19, wherein a projected width of each of said slopes or short side faces on said reference plane is not larger than 40 $\mu$m.

22. A light pipe unit according to claim 18, wherein said light output means in said surface light guide plane is constituted by a repetitive structure disposed at regular intervals of a pitch in a range of from 50 $\mu$m to 1.5 mm.

23. A light pipe unit according to claim 17, wherein a ratio of a thickness of said linear light pipe to a thickness of said surface light pipe is in a range of from 1 to 2 in terms of faces of partial connection.

24. A light pipe unit according to claim 17, wherein connection portions between said surface light pipe and said linear light pipe are portions which are not thicker than 2 mm at longitudinal opposite ends of said incidence side surface of said surface light pipe or portions which are not thicker than ¼ as thick as one or both of said upper and lower surfaces.

25. A light pipe unit according to claim 17, wherein said surface light pipe and said linear light pipe are integrally formed as an integrally molded body or separately formed and connected to each other by an adhesive agent.

26. A plane light source unit comprising a light pipe unit according to claim 17, wherein a point light source is disposed on said linear light pipe of said light pipe unit.

27. A liquid-crystal display device comprising a plane light source unit according to claim 26, and a liquid crystal cell.

* * * * *